(12) United States Patent
Fathalla (10) Patent No.: US 8,166,492 B2
(45) Date of Patent: Apr. 24, 2012

(54) APPLICATION COMPATIBILITY USING A HYBRID ENVIRONMENT

(75) Inventor: Diaa Fathalla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 11/733,274

(22) Filed: Apr. 10, 2007

(65) Prior Publication Data

US 2008/0256564 A1    Oct. 16, 2008

(51) Int. Cl.
*G06F 9/40* (2006.01)

(52) U.S. Cl. ........ 719/331; 719/319; 719/332; 717/162; 717/163

(58) Field of Classification Search ............. None
See application file for complete search history.

(56) References Cited

U.S. PATENT DOCUMENTS

| | | | | |
|---|---|---|---|---|
| 5,375,241 A * | 12/1994 | Walsh | | 719/331 |
| 5,689,710 A * | 11/1997 | Stanley et al. | | 719/331 |
| 5,734,904 A * | 3/1998 | Kanamori et al. | | 719/331 |
| 5,799,189 A | 8/1998 | Koser et al. | | |
| 5,812,848 A * | 9/1998 | Cohen | | 719/331 |
| 5,828,881 A * | 10/1998 | Wang | | 719/314 |
| 5,838,911 A * | 11/1998 | Rosenhauer et al. | | 709/203 |
| 5,903,755 A * | 5/1999 | Matheson et al. | | 719/315 |
| 5,964,843 A * | 10/1999 | Eisler et al. | | 719/323 |
| 6,026,238 A * | 2/2000 | Bond et al. | | 717/141 |
| 6,035,121 A * | 3/2000 | Chiu et al. | | 717/141 |
| 6,105,101 A * | 8/2000 | Hester et al. | | 710/260 |
| 6,108,715 A * | 8/2000 | Leach et al. | | 719/330 |
| 6,148,325 A * | 11/2000 | Schmidt et al. | | 718/107 |
| 6,311,058 B1 * | 10/2001 | Wecker et al. | | 455/418 |
| 6,389,591 B1 | 5/2002 | Andrew | | |
| 6,438,621 B1 * | 8/2002 | Kanamori et al. | | 719/331 |
| 6,484,309 B2 * | 11/2002 | Nowlin et al. | | 717/100 |
| 6,553,429 B1 * | 4/2003 | Wentz et al. | | 719/330 |
| 6,763,518 B2 * | 7/2004 | Hart et al. | | 718/1 |
| 6,915,452 B2 | 7/2005 | Froehlich et al. | | |
| 6,980,946 B2 * | 12/2005 | Giles et al. | | 703/22 |
| 2001/0008023 A1 * | 7/2001 | Bond et al. | | 717/8 |
| 2002/0066085 A1 * | 5/2002 | Nowlin, Jr. et al. | | 717/137 |
| 2002/0078260 A1 * | 6/2002 | Hart et al. | | 709/329 |
| 2003/0131147 A1 * | 7/2003 | Wilt et al. | | 709/321 |
| 2003/0167463 A1 | 9/2003 | Munsil et al. | | |
| 2004/0268359 A1 * | 12/2004 | Hanes | | 719/310 |
| 2005/0044148 A1 * | 2/2005 | Son et al. | | 709/205 |
| 2006/0010433 A1 | 1/2006 | Neil | | |
| 2006/0114132 A1 * | 6/2006 | Zhang et al. | | 341/50 |
| 2006/0146057 A1 | 7/2006 | Blythe | | |
| 2006/0281556 A1 | 12/2006 | Solomon et al. | | |

OTHER PUBLICATIONS

Rosenblum, M., "The Reincarnation of Virtual Machines," QUEUE, Jul./Aug. 2004, http://delivery.acm.org/10.1145/1020000/1017000/rosenblum.pdf?key1=1017000&key2=6793212711& coll=GUIDE& dl=GUIDE&CFID=11852082& CFTOKEN=85655334. Honeycutt, J., "Microsoft Virtual PC 2004 Technical Overview," Microsoft Corporation, 2003, http://wvvw.udrogoth.com/Virtual_PC_Technical_Overview.pdf.
Howell et al., "Integrating the Spiralog File System into the OpenVMS Operating System," Digital Technical Journal, vol. 8, No. 2, 1996, http://www.hpl.hp.com/hpjournal/dtj/vol8num2/vol8num2art4.ps.
Chen, et al., "Live updating operating systems using virtualization," VEE, 2006, http://delivery.acm.org/10.1145/1140000/1134767/p35-chen.pdf?key1=1134767&key2=3617212711&coll-GUIDE& dl=GUIDE&CFID=15000096&CFTOKEN=87339369.

* cited by examiner

Primary Examiner — Andy Ho
Assistant Examiner — Shih-Wei Kraft (57) ABSTRACT

A hybrid environment may be used for addressing application compatibility between a host operating system and one or more application(s) optimized to run on a different ("guest") version of the host operating system. A thunking wrapper consisting of a native thunking layer, a service thunking layer, and a subsystem thunking layer provides translation between the guest application and the host operating system for a seamless interface. Multiple thunking wrappers may be included to support application compatibility between multiple guest operating systems and the host operating system.

13 Claims, 7 Drawing Sheets

APPLICATION COMPATIBILITY USING A HYBRID ENVIRONMENT

BACKGROUND

This Background is intended to provide the basic context of this patent application and it is not intended to describe a specific problem to be solved.

New software applications and new versions of existing software applications are continually being developed. Many software applications are designed specifically for the operating system in use at the time the software application is developed. For a variety of reasons, many software applications that are designed for a specific operating system do not work correctly with a new release of the operating system. One reason that an application may not work with a new release of the operating system is that application developers may not always follow the programming specifications provided by operating system developers. For example, operating system specifications typically recommend that application developers use an operating system function to determine the location of a file. However, an application developer may believe that a certain type of file is always stored at a specific location in the computer. Instead of following the operating system specifications and requesting the file location from the operating system, the application developer may specify a certain file location in the application program. This may cause the application to be incompatible with a new release of the operating system that stores the file in a different location than that specified in the applications program.

Even when application developers do follow the procedures recommended by operating system developers, software applications still may not work properly with a new release of an operating system. Often times software developers make assumptions about operating system functions which may not hold true when a new version of the operating system is released. For example, an application developer may assume that a certain function of the existing operating system always returns a certain value if an error occurs within that function. If previous versions of the operating system returned a value of −1 to indicate an error, an application developer may assume that only a −1 value will be returned in the future to indicate the error. A new version of the operating system may, however, modify the function to return other values based on the error, thereby potentially causing the application program to not work correctly in all situations with a new version of the operating system.

In other instances, an application program may seem to operate correctly with one version of an operating system even though the application program contains errors. Applications programs containing errors may operate correctly with operating system that does not detect the errors in the application program. Application programs containing errors may also operate correctly with an older version of the operating system that detects the errors in the application program but does not require that the errors be corrected. A new version of the operating system may check for and require correction of the previously undetected or uncorrected errors thereby causing the application program to be incompatible with the new version of the operating system.

The problems with incompatible applications become more severe as an operating system grows in popularity. When an operating system becomes popular during its release, thousands of applications will be developed specifically for the operating system. The large number of applications, as well as a more diverse group of applications developers, may result in many more applications being incompatible with a new version of the operating system. Users of currently working applications may not want to switch to a newer operating system if their applications will not work correctly with the newer operating system.

There are several approaches that have been used in the past to handle compatibility issues between software applications and operating systems. One approach requires application developers to fix their own applications themselves. One disadvantage of this approach is that not all application developers provide fixes or patches for their applications. Even if application developers do provide a patch for their applications, not all users will obtain and correctly install the patches on their computers. This may result in many applications remaining incompatible with a new release of the operating system.

Another approach to handling incompatible application problems involves operating system developers integrating patches for known problem applications into the new version of the operating system. While the operating system patch approach avoids the problem of relying upon application developers to fix their own applications, the operating system patch approach creates many other problems. First, the patches may add a significant amount of code to the operating system, which may significantly increase the space requirements of the operating system. Second, all applications are required to operate through this additional patch layer even though many applications are compatible with the new operating system and do not need the patches to properly operate. The additional patch layer can cause compatible applications programs to unnecessarily run slower. Third, the operating system programming code may become very cluttered due to the number of application programs that may need to be fixed. The cluttered programming can make it more difficult for the operating system developers to modify and improve the operating system. Finally, it is impossible for an operating system developer to know all of the applications that will not work correctly with a new release of the operating system. Therefore, subsequent patches must be made to the operating system in order to allow these programs to work correctly. This in turn adds another layer to the already complex operating system, which further causes the operating system to operate less efficiently. Therefore, the approach to fixing incompatible applications by providing special code in the operating system can negatively impact other applications as well as the operating system itself.

One approach to solve some of the problems associated with the operating system patch approach described above enables an application to be patched dynamically and reduces the negative effects on other applications and the operating system. This approach may be called a "shimming" approach, where an incompatible application is patched by dynamically inserting a dynamic link library into the incompatible application's address space. The dynamic link library determines the functions in the incompatible application that need to be patched and patches those functions. Calls in the incompatible application are shimmed or redirected to fixes and/or patches in the operating system. A shimming approach, however, does not solve all of the problems of application incompatibility. As described above, operating system developers cannot know all of the applications that will not be compatible with a new release of an operating system. A shimming approach requires each individual incompatible application to be identified and modified in a "post-mortem point-fix" strategy which may result in higher maintenance costs for the software and visible incompatibility issues to the end user.

Another approach to solving incompatibility issues is the use of a virtual machine. A virtual machine is software that creates a virtualized environment between the computer platform and its operating system, so that the end user can operate software (that would be otherwise incompatible with the operating system) on an abstract machine. Compatibility issues are resolved by loading applications onto a virtual machine which contains the environment for which the application was optimized, including the dynamic link library functions of its native operating system version. The virtual instance of the native operating system version appears totally isolated from the actual operating system; the application thinks it is running on its native operating system version and may have less chance of glitches. The virtual machine approach has several disadvantages, though. There is a high performance and memory impact from loading all of the code needed to emulate other operating system versions, especially if more than one virtual machine is needed. Also, applications are totally isolated from the actual operating system, resulting in inconvenience for the end user and inability to utilize components of the actual operating system. For example, if a user created a File A under a virtual machine version A, s/he would need to use the editor and console screen manager of virtual Machine Version A to manipulate File A. The editor and console screen manager of Actual Operating System B would not be able to access File A, nor would the user be able to use New Application B of Actual Operating System B to manipulate File A.

Because of the issues described above, a need exists for an application compatibility approach which minimizes memory and performance issues, minimizes software maintenance costs, is able to address compatibility in a more holistic manner, is more transparent to the end-user and allows the end-user to take advantage of the newer functionality of an operating system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hybrid environment may be used for addressing application compatibility between a host operating system and an application which is optimized to run on a different ("guest") version of the host operating system. The host operating system may be a newer version of the guest operating system or the host operating system may be an older version. In either case, the host operating system may contain all components native to the host version, including a set of host services, a set of host subsystems, and other host operating system functions. The guest application may contain instructions to perform its application duties, including calls to dynamic link library functions ("DLLs") native to the guest operating system. Thus, the host operating system and the guest application may be complete unto themselves, however, the inclusion of a thunking wrapper in this hybrid environment may provide application compatibility between the guest application and the host operating system.

The thunking wrapper may consist of several thunking layers between the guest application and the host operating system a native thunking layer, a service thunking layer, and a subsystem thunking layer. Each thunking layer may have the function of mapping or translating between one calling convention to another, or in a sense, updating from one format to another.

A native thunking layer may translate between guest operating system DLLs invoked by the guest application and host operating system DLLs. In one example, the guest operating DLLs may be user mode DLLs associated with the guest operating system and the host operating system DLLs may be kernel mode DLLs associated with the host operating system. In another example, the delineation between user and kernel mode DLLs may be intermixed between the guest application and the host operating system. In any case, when the guest application wishes to communicate with a host operating system function, it may call a guest DLL. The native thunking layer then may translate this call into a format understood by the host operating system.

Similarly, the service thunking layer may translate between the guest application and a host service native to the host operating system. A host service may be a process which starts when the host operating system is booted. The host service may run in the background, and other application processes may communicate with it. Examples of host services may include but are not limited to lookups, event logs, etc. When a guest application wishes to communicate with a host service, the service thunking layer translates the call into a format understood by the host service. Note that a single service thunking layer may handle all translation requests between a guest application and any of the host services on the host operating system.

A subsystem may be a functional area which performs a specific task. An example of a subsystem may include but is not limited to a client-server run time subsystem (CSRSS). Application processes may also communicate with a subsystem to request that a specific task to be performed. When a guest application wishes to communicate with a host subsystem, the subsystem thunking layer translates the call into a format understood by the host subsystem. Note that a single subsystem thunking layer may handle all translation requests between a guest application and any of the host subsystems on the host operating system.

The thunking wrapper of the hybrid environment need not only surround a single guest application. If multiple guest applications native to the same guest operating system require application compatibility with the host operating system, a single thunking wrapper may envelope all of the guest applications. Additionally, if there are guest applications native to different versions of the host operating system, each set of applications which are optimized for the same guest version may share one thunking wrapper. For example: if guest applications A1, A2, and A3 are optimized for guest version A, and guest applications B1 and B2 are optimized for guest version B, to support application compatibility the hybrid environment may include thunking wrapper A and thunking wrapper B respectively. Of course, the hybrid environment may include more than two thunking wrappers if there are guest applications native to more than two guest versions of the operating system.

The hybrid environment approach to application compatibility may provide several advantages over a shimming approach. Shimming approaches may require a custom fix or fixes for each application, where calls in each application are redirected to a patch. With a shimming approach, every incompatible call in every incompatible applications may need to be identified in order to prepare the patches, in a sense, a "point-fix" approach. With the plethora of applications associated with a guest version of an operating system, it may be virtually impossible for operating system developers to exhaustively test and fix all applications for compatibility before the new version of the operating system is released.

Indeed, a significant amount of fixes may be identified and applications may be modified after release when users discover incompatibility, thus leading to user dissatisfaction with the operating system product.

The hybrid environment may solve these problems by providing a more comprehensive (as opposed to a "point-fix") approach to compatibility. The thunking wrapper may be global to all applications native to the guest operating system and may be loaded together with the host operating system. Guest application calls may not need to be redirected to fixes. Point-fixes may not need to be individually discovered, tested, managed, and maintained. The thunking wrapper may be transparent to the guest applications, and may provide a seamless interface between the guest application DLLs and the host operating system. Thus, the hybrid environment lessens the chance of a user discovering application compatibility issues on a new operating system product.

The hybrid environment approach to application compatibility may also provide advantages over a virtual machine approach. A virtual machine approach may replicate an entire guest operating system in an environment isolated from the host operating system. While guest applications may run smoothly since all of the guest operating system DLLs and functions are present, there may be a high performance and memory impact due to the necessity of including all of the entire guest operating system functions. Additionally, there may be no communication between processes running under the guest operating system virtual machine and the host operating system. For instance, a data file created by a guest host service to manipulate the data file, the file may not be easily found (if at all) since the virtual machine operating system saves it to a different space. Nor would the user be able to take advantage of host services offered by the host operating system to manipulate the data file.

The hybrid environment may solve these problems with the use of the thunking wrapper. The memory size of the thunking wrapper may be much smaller than replicating an entire guest operating system. This memory size difference may be more marked when multiple guest operating systems need application compatibility—the space to support multiple virtual machines does not need to be used. Additionally, since the data spaces are not segregated between the guest and host operating systems, performance may be improved in the hybrid environment and a user may be able to take full advantage of host services and host subsystems.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
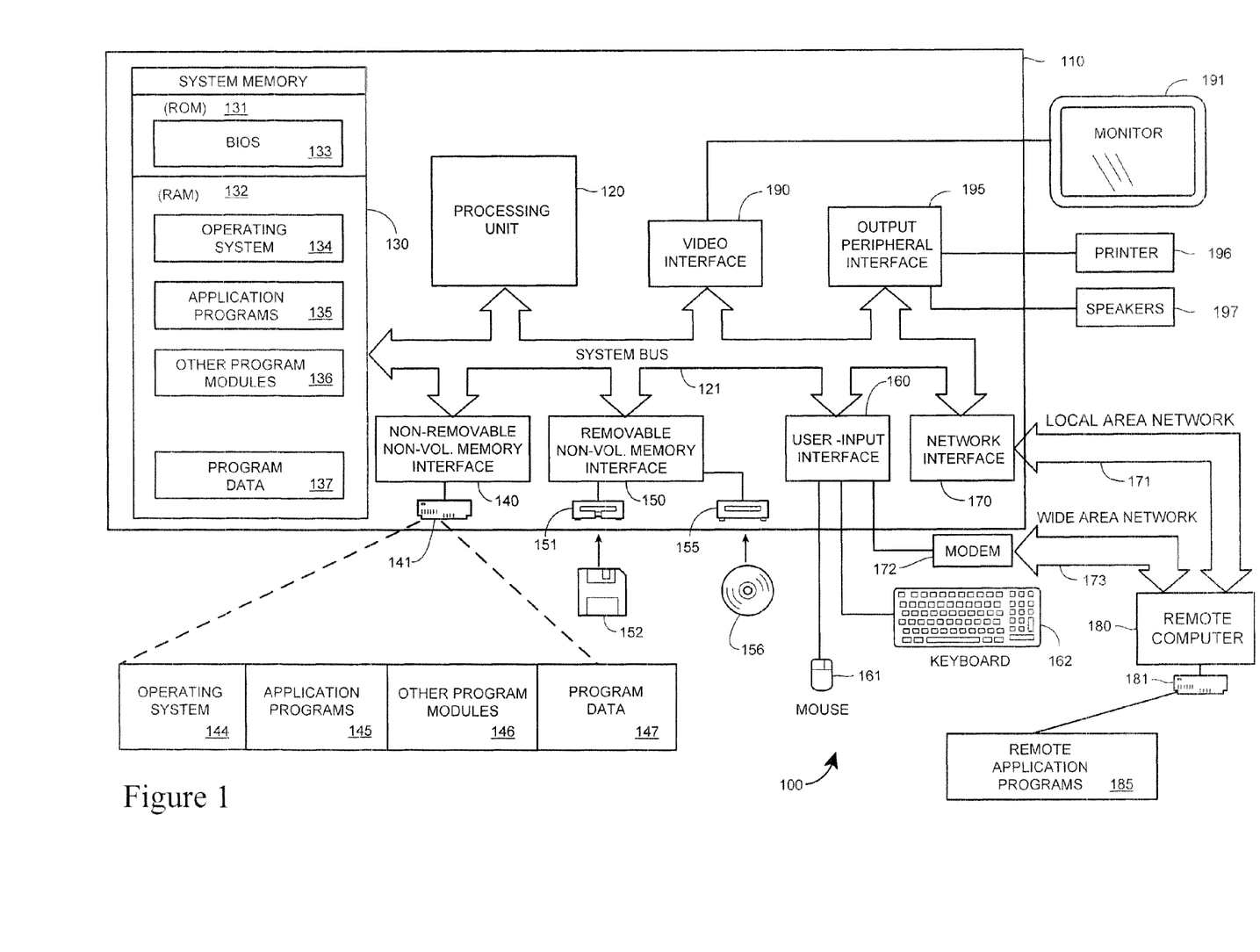
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should be computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 10 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 10 may operate in a networked environment using logical connections to one or more remote computers such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Figure 2A:
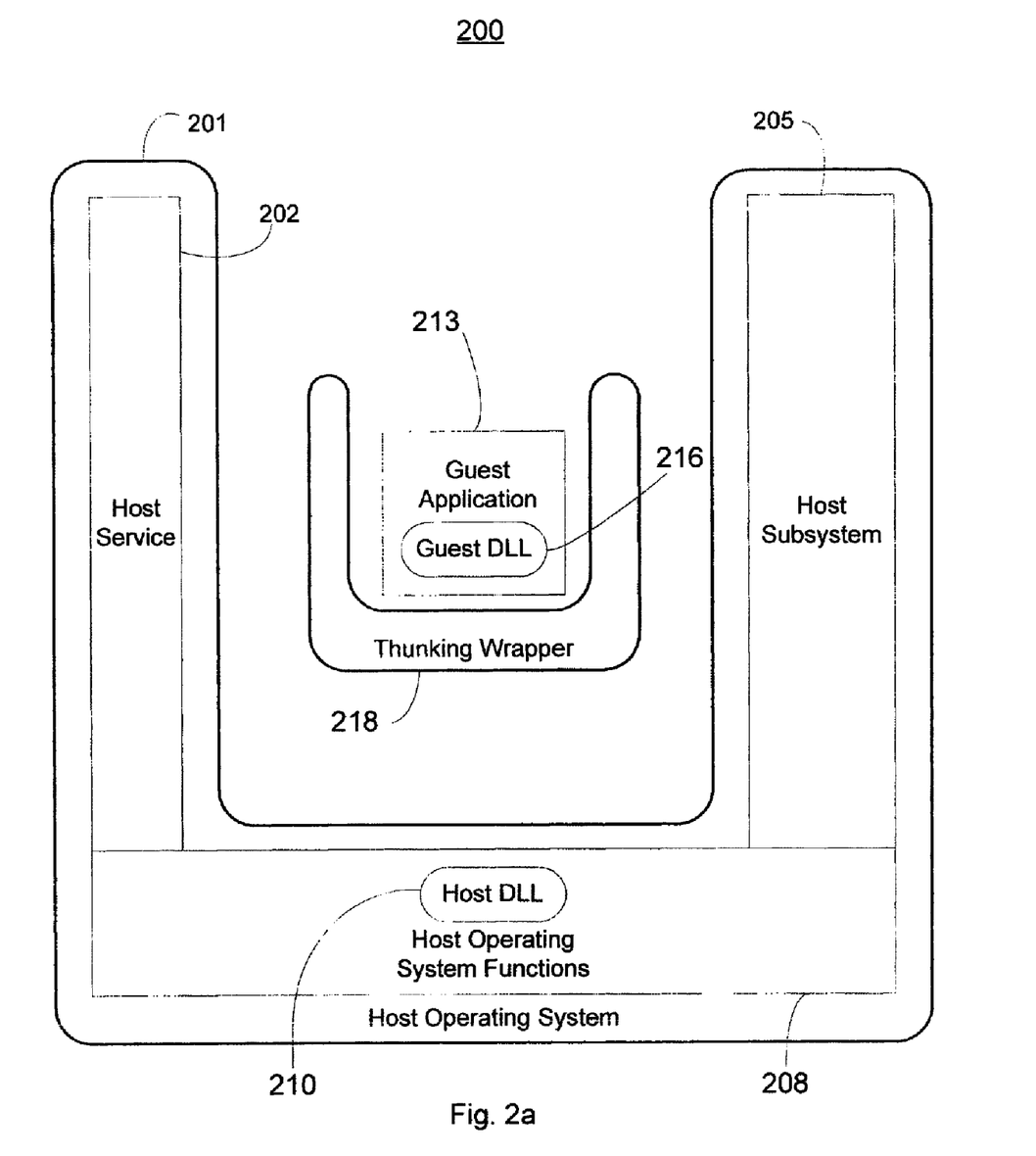
FIG. 2*a* is an embodiment of a computer architecture using the hybrid environment that may provide compatibility between a guest application and a host operating system.

FIG. 2a illustrates an embodiment of a computer architecture 200 which uses a hybrid environment to support application compatibility. A host operating system 201 may be present containing a host service 202, a host subsystem 205, and a set of host operating functions, one of which may be a host dynamic link library function ("host DLL") 210. A guest application 213 native to a different version of the operating system may be present, containing its own guest dynamic link library function ("guest DLL") 216 and optimized for the guest operating system. The guest operating system may typically be an earlier version of the host operating system 201, but may also be a later version. To provide compatibility with the host operating system 201, the guest application 213 is surrounded by a thunking wrapper 218.

Figure 2B:
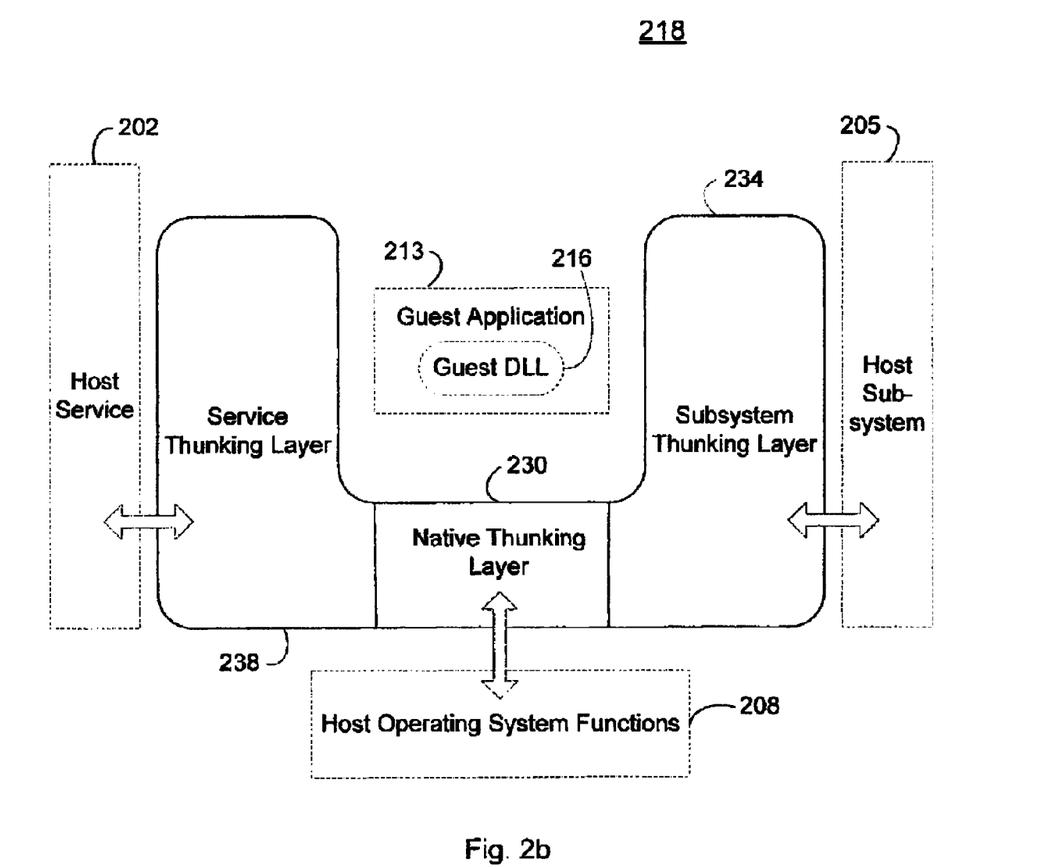
FIG. 2*b* provides more detail for the thunking wrapper shown in FIG. 2*a*.

Further detail of the thunking wrapper 218 is illustrated in FIG. 2b. The thunking wrapper 218 may consist of a native thunking layer 230, a service thunking layer 238, and a subsystem thunking layer 234. These thunking layers may provide translation between the guest application 213 and the host operating system 201 of FIG. 2a as follows: the service thunking layer 238 translates between the guest application 213 and the host service 202, the subsystem thunking layer 234 translates between the guest application 213 and the host subsystem 205, and the native thunking layer 230 translates between a guest DLL 216 and a host DLL 210 in the set of host operating system functions 208.

For example if the host service 202 is a look-up service, and the guest application 213 wishes to communicate with the look-up service, it may invoke a corresponding guest DLL 216. The service thunking layer 238 may translate the request into a format understood by the host look-up service 202, and thus the guest application 213 has compatibility with the host operating system 201. Of course, in other embodiments, the host service 202 may be any other service resident on the host operating system 201 and more than one guest DLLs 216 may need to be translated by the service thunking layer 238 while communicating with the host service 202.

In another example, if the host subsystem 205 has the function of managing console windows, and the guest application 213 wishes to communicate with this console window manager, it may invoke a corresponding guest DLL 216. The subsystem thunking layer 234 may translate the request into a format understood by the host console window manager subsystem 205, and thus the guest application 213 has compatibility with the host operating system 201. In other embodiments, the host subsystem 205 may be any subsystem supported by the host operating system 201 and need not be limited to a console window manager. Furthermore, other embodiments may have a subsystem being accessed with the subsystem thunking layer 234 operating on more than one guest DLL 216.

A further example using the embodiment of the hybrid environment architecture illustrated by FIGS. 2a and 2b is the communication of the guest application 213 directly with host operating system functions 208 through the native thunking layer 230. In this example, the guest DLL 216 may be in user mode and the host DLL 210 may be in kernel mode. The native thunking layer 230 may translate between the two modes (user/kernel) to provide application compatibility. In other embodiments, more than one guest DLL 216 and more than one host DLL 210 may be used. Not all the guest DLLs 216 need to be in user mode and not all the host DLLs 210 need to be in kernel mode; other partitioning of DLLs may be used in other embodiments.

Figure 3A:
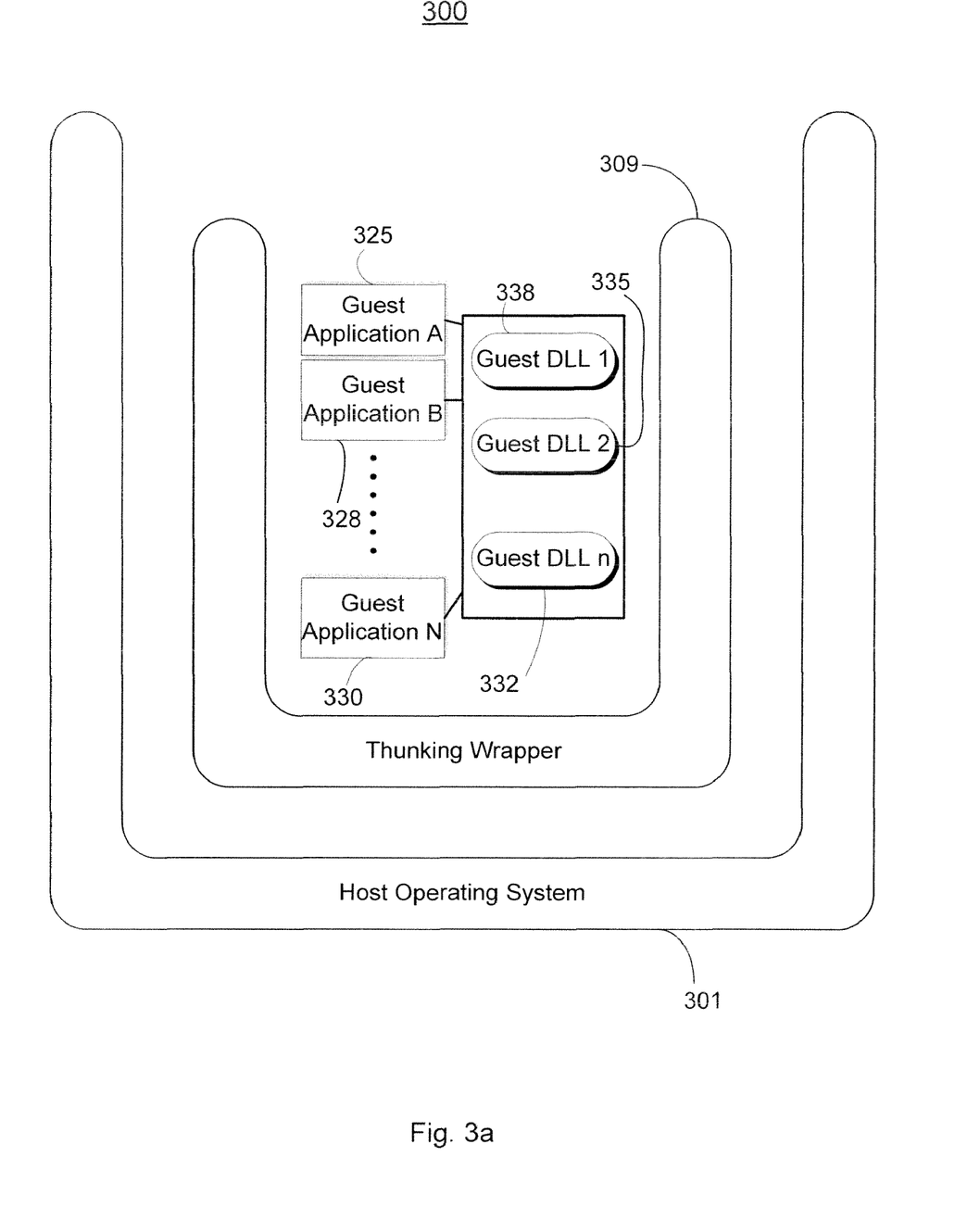
FIG. 3*a* is an embodiment of a computer architecture using the hybrid environment that may provide compatibility between a host operating system and multiple guest applications which are optimized for a different version of the host operating system.
Figure 3B:
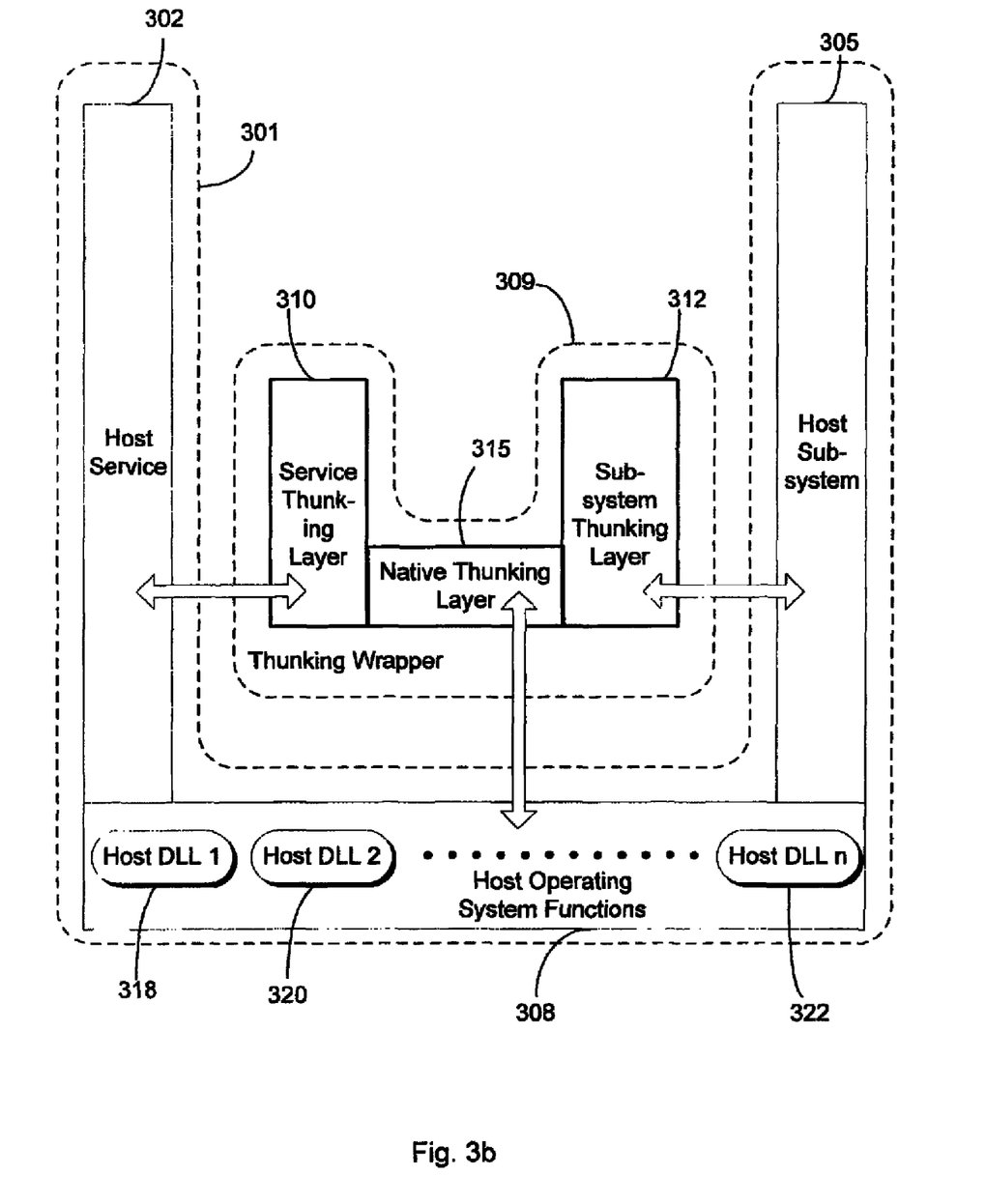
FIG. 3*b* provides more detail for the thunking wrapper and host operating system shown in FIG. 3*a*.

The illustrations thus far have been simplified in order to clearly illustrate a basic hybrid environment architecture. Some of the advantages of the hybrid environment architecture are more fully shown by the embodiment shown in FIGS. 3a and 3b, wherein FIG. 3b provides more detail to the elements of FIG. 3a. A computer architecture 300 may be running a host operating system 301. The host operating system 301 may consist of a host service 302, a host subsystem 305, and a set of host operating system functions 308 which may contain multiple host dynamic link library functions 1 through n (318, 320, 322). Multiple guest applications A through N (325, 328, 330) which have been optimized to run on a different version of the operating system 301 may be introduced into the computer architecture 300 along with their corresponding multiple guest DLLs 1 through n (332, 335, 338). All guest applications and guest DLLs are optimized for the guest operating system 310, they may be enveloped in a thunking wrapper 309 which may consist of a service thunking layer 310, a subsystem thunking layer 312, and a native thunking layer 315.

As an illustrative example, consider an embodiment where the host service 302 is an event log service. If guest application B 328 wishes to use the event log service 302, it may invoke the corresponding guest DLLs (for example, guest DLL 1 (338) and guest DLL 2 (335)). The service thunking layer 310 may then translate the request from guest application B 328 into a form which is understood by the event log service 302. If guest application N 330 also wishes to use the event log service 302, it may invoke the same guest DLLs 338 and 335, and its request may be translated by the service thunking layer 310 into a request understood by the event log service 302.

Note that this embodiment of the hybrid environment approach to compatibility requires only one thunking wrapper 309 for all applications A-N (325, 328, 330) in order for them to be compatible with the host operating system 301. A shimming approach to compatibility requires separate patches to be created, loaded, and run for each different guest application. Due to the large number of applications, many of the patches are pin-point fixes individually created after development of the host operating system. The hybrid environment approach, however, is more comprehensive—the thunking wrapper 309 is common for all guest applications A-N (325, 328, 330) and provides a seamless interface to the host operating system 301. Application compatibility is therefore easier to maintain, and less expensive in both memory and processor usage.

Other advantages of the hybrid environment approach over a virtualized machine approach for application compatibility are memory savings and integration of accessibility for the user. A virtualized machine replicates the guest operating system in its entirety and is totally isolated from the host operating system, including any host services, subsystems, and user files created under the host operating system. The hybrid environment illustrated by the embodiment in FIGS. 3a and 3b shows how guest applications A-N (325, 328, 330) may communicate with host service 302, host subsystem 305, and host operating primitives 308 through the thinking layers 310, 315, and 312. For example, in the hybrid environment a user who creates a data file using guest application A 325 may be able to use a host subsystem 305 or a host service 302 to further manipulate the data file. In a virtual machine environment, the data file created under guest application A would be totally isolated; any memory usage is decreased using the hybrid environment approach since there is no need to replicate the entire guest operating system (including guest services, guest subsystems, and operating system functions) on the computer.

Figure 4A:
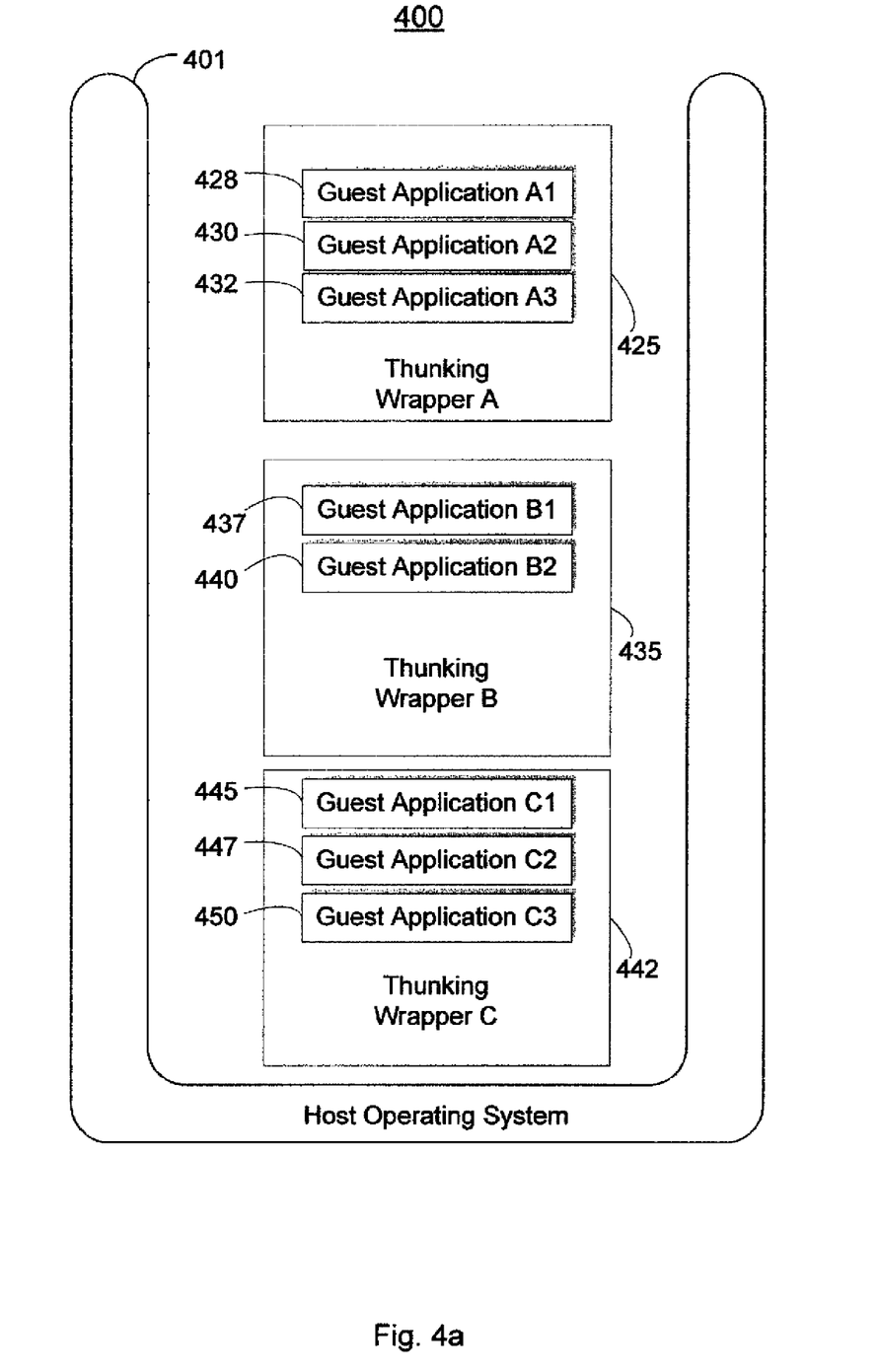
FIG. 4 is an embodiment of a computer architecture using the hybrid environment that may provide compatibility between a host operating system and multiple guest applications which are optimized for multiple different versions of the host operating system.
Figure 4B:
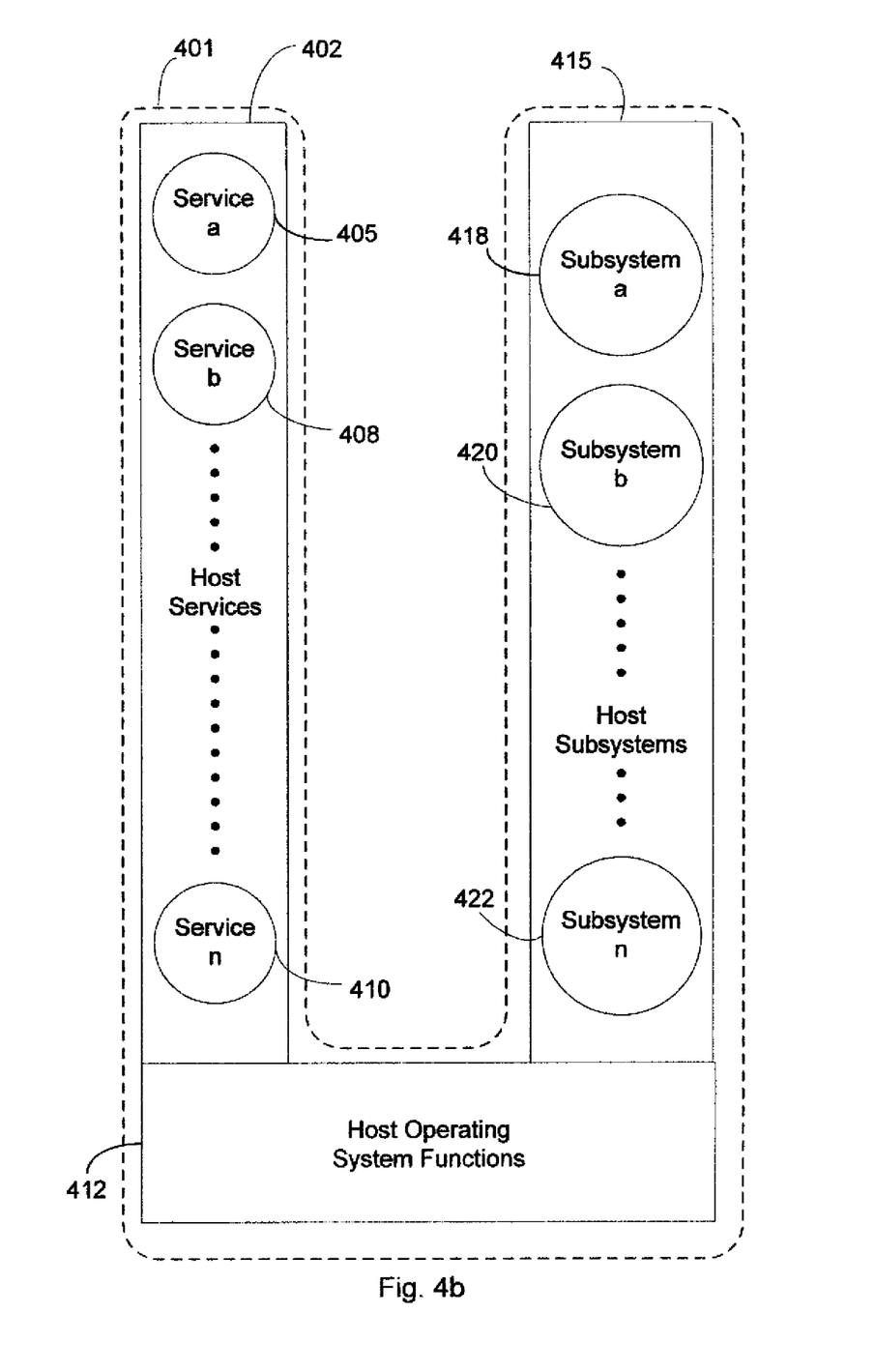
FIG. 4*b* provides more detail for the host operating system of FIG. 4*a*.

Yet another embodiment of the hybrid environment is illustrated by FIGS. 4a and 4b, wherein FIG. 4b provides more detail to the elements of FIG. 4a. In this computer architecture 400, the host operating system 401 may consist of a multitude of host services a-n 402 (405, 408, 410), a multitude of host subsystems a-n 415 (418, 420, 422), and a set of host operating system functions 412. Thunking wrapper A 425 may serve to provide compatibility between applications optimized for guest operating system A, and may envelope guest applications A1 (428), A2 (430), and A3 (432). Similarly, thunking wrapper B 435 may provide compatibility between guest applications B1 (437) and B2 (440) and the host operating system 401. Thunking wrapper C 442 may provide compatibility between guest applications C1 (445), C2 (447), and C3 (450) and host operating system 401.

In this embodiment, applications native to three different versions of the host operating system 402 may co-exist in computer architecture 400 and may have compatibility with the host operating system 401. Each application (428, 430, 432, 437, 440, 445, 447, 450) may have access to all host services 402 and to all host subsystems 415. Each application (428, 430, 432, 437, 440, 445, 447, 450) may also communicate with the host operating system functions 412, which in some embodiments may contain kernel processes of the host operating system 401.

Note that this embodiment does not require replicating entire guest operating systems A, B, and C as a virtual machine approach would do. Also, applications (428, 430, 432, 437, 440, 445, 447, 450) are not isolated from each other and from the host operating system 401 since they are able to communicate through their respective thunking wrappers A 425, B 435, and C 442.

Additionally note that this embodiment does not require discovering, creating, maintaining, and shimming in patches for each application 428, 430, 432, 437, 440, 445, 447, 450). Application compatibility is cleanly provided by thunking wrapper A 425, thunking wrapper B 435, and thunking wrapper C 442.

Of course, the hybrid environment illustrated by FIGS. 4a and 4b is not limited to only three different versions of the operating system 401. Multiple versions of the operating system 401 may be supported as needed by the addition of corresponding thunking wrappers.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A computer-readable storage medium having computer-executable components or modules allowing compatibility between a host operating system and a guest application native to a guest operating system wherein the guest operating system and the host operating system comprise different versions of a same operating system and the host operating system is a newer version of the guest operating system, the computer-executable components or modules comprising:
the host operating system, wherein the host operating system includes a host service, a host subsystem, a set of host dynamic link libraries ("DLLs") comprising kernel mode DLL functions native to the host operating system;
a set of guest DLLs comprising user mode DLL functions native to the guest operating system;
a plurality of guest applications, wherein each guest application includes a call to one of the guest DLL functions; and
a thunking wrapper performing thunking for the guest applications, wherein the thunking layers do not execute operating system functions of the guest operating system, the thunking wrapper including:
a native thunking layer invoked to translate between the guest DLL and the host DLL when the guest applications invoke calls to the guest DLL,
a subsystem thunking layer invoked to translate between the guest application and the host subsystem when the guest applications invoke calls a host subsystem function,
a service thunking layer invoked to translate between the guest application and the host service when the guest applications invoke calls a host service function.

2. The computer-readable storage medium of claim 1, wherein the host operating system comprises a plurality of host services and a plurality of host subsystems.

3. The computer-readable storage medium of claim 1, further comprising a first guest application native to a first guest operating system with a first thunking wrapper corresponding to the first guest operating system, and a second guest application native to a second guest operating system with a second thunking wrapper corresponding to the second guest operating system.

4. A method, performed by a computing device, for supporting compatibility between a first version of an operating system and applications running concurrently on the computing device and optimized to run on a second version of the same operating system, the first version newer than the second version, the method comprising:
executing, by the computing device, the first version of the operating system, the first version of the operating system including a first service, a first subsystem and a first dynamic link library (DLL) having a first function, wherein the first DLL runs in kernel mode; and
during execution, by the computing device, of the applications optimized to run on the second version of the operating system, the applications including a call to a second function in a second DLL, wherein the second DLL runs in user mode and the second function is native to the second version of the operating system:
thunking, using a native thunking layer, native calls from the applications to the first version of the operating system, including translating between the second DLL and the first DLL, wherein the native thunking layer does not execute operating system functions of the second version of the operating system;
thunking, using a service thunking layer, service calls from the application to the first service on the first version of the operating system, including translating between the applications and the first service; and
thunking, using a subsystem thunking layer, a subsystem call from the applications to the first subsystem on the first version of the operating system, including translating between the applications and the first subsystem.

5. The method of claim 4, wherein thunking a native call further includes translating a second version of the operating system function call into a calling convention understood by the first version of the operating system.

6. The method of claim 5, wherein thunking a native call further includes translating each of a plurality of second version of the operating system user dynamic link library functions into a calling convention understood by each of a plurality of first version of the operating system kernel dynamic link library functions.

7. The method of claim 4, wherein thunking a service call further includes translating a second version of the operating system service call into a calling convention understood by the service on the first version of the operating system.

8. The method of claim 4, wherein thunking a subsystem call further includes translating a second version of the operating system subsystem call into a calling convention understood by the subsystem on the first version of the operating system.

9. The method of claim 4, wherein
thunking a native call further includes comprises thunking a native call from each of a plurality of applications,
thunking a service call further includes comprises thunking a service call from each of the plurality of applications, and
thunking a subsystem call further includes comprises thunking a subsystem call from each of the plurality of applications.

10. The method of claim 4, wherein thunking a service call further includes thunking a service call from the application to each of a plurality of services on the first version of the operating system, and wherein thunking a subsystem call further includes thunking a subsystem call from the application to each of a plurality of subsystems on the first version of the operating system.

11. A computer-readable storage medium including computer-executable instructions stored thereon and executable by a processor to perform a method for supporting compatibility between a first version of an operating system and a plurality of applications optimized to run on a second version of the same operating system and executing concurrently on a computer on which the second version of the operating system is executing, wherein the second version of the operating system is newer than the first version of the operating system, the method comprising:
thunking, using a native thunking layer, native calls from the applications to the first version of the operating system, including translating between a first DLL included in the first version of the operating system and a second DLL included in the applications;
thunking, using a service thunking layer, service calls from the applications to a service on the first version of the operating system, including translating between the applications and the service;
thunking, using a subsystem thunking layer, a subsystem call from the application to a subsystem on the first version of the operating system, including translating between the application and the subsystem, wherein the thunking layers do not directly implement the first version of the operating system; and
thunking a native call further includes translating a set of user dynamic link layer functions ("user DLLs") called by the application optimized for the second version of the operating system into a form understood by each member of a set of kernel dynamic link layer functions ("kernel DLLs") of the first version of the operating system,
thunking a service call further includes translating the set of user DLLs called by the application optimized for the second version of the operating system into a form understood by each of a plurality of services on the first version of the operating system; and
thunking a subsystem call further includes translating the set of user DLLs called by the application optimized for the second version of the operating system into a form understood by each of a plurality of subsystems on the first version of the operating system.

12. The computer-readable storage medium of claim 11, wherein the method further comprises supporting compatibility between the first version of the operating system and a plurality of applications optimized to run on the second version of the operating system.

13. The computer-readable storage medium of claim 11, wherein the method further comprises supporting compatibility between the first version of the operating system and a plurality of applications, wherein a first subset of the applications is optimized to run on the second version of the operating system, and a second subset of the applications is optimized to run on a third version of the operating system.

* * * * *